Sept. 9, 1958     J. R. CLARK     2,851,229
VARIABLE-CONTOUR AIRFOIL
Filed May 3, 1956     2 Sheets-Sheet 1
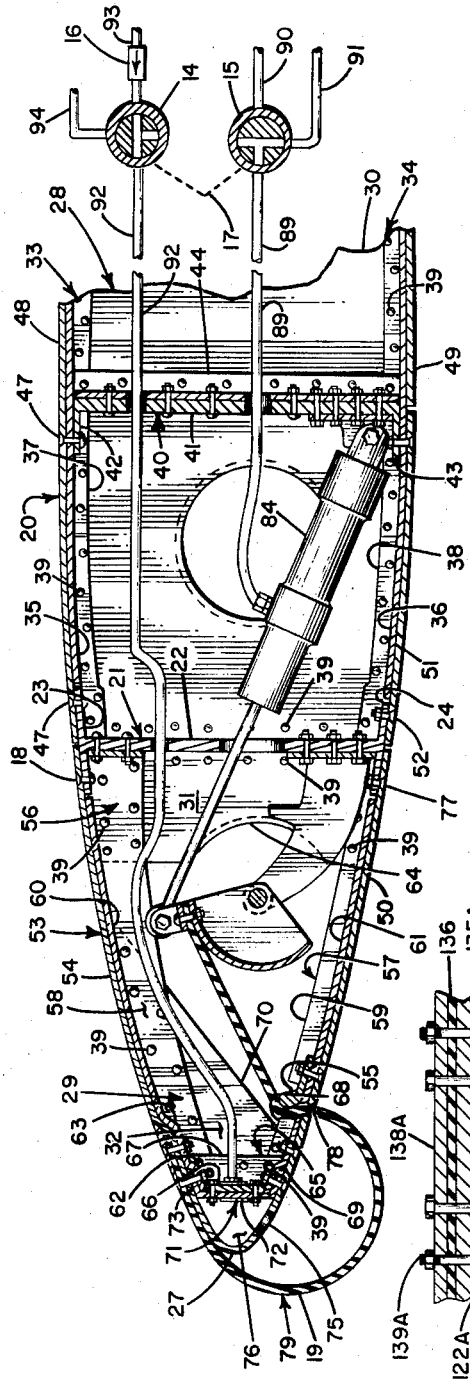
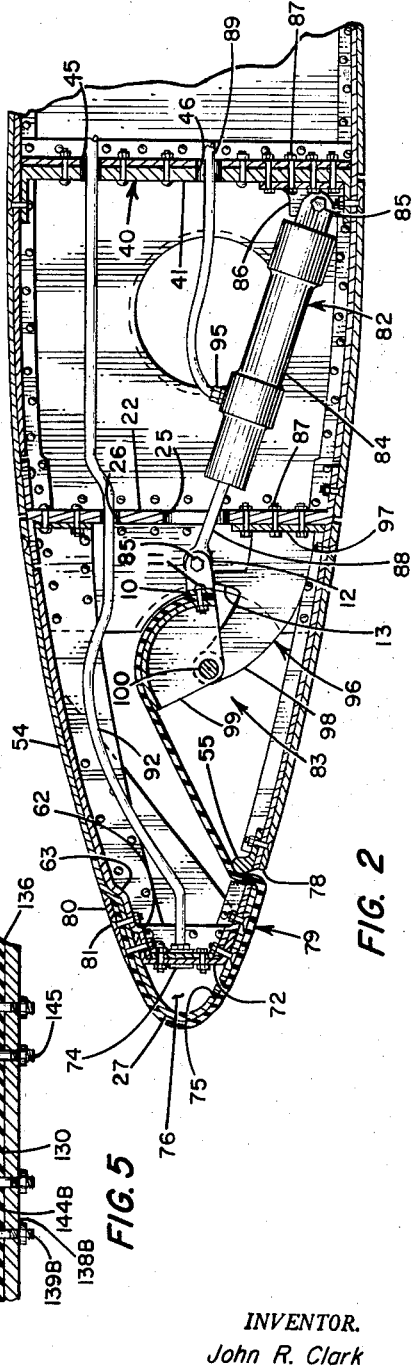
INVENTOR.
John R. Clark
BY
W. R. Robertson
AGENT Sept. 9, 1958  J. R. CLARK  2,851,229
VARIABLE-CONTOUR AIRFOIL
Filed May 3, 1956  2 Sheets-Sheet 2
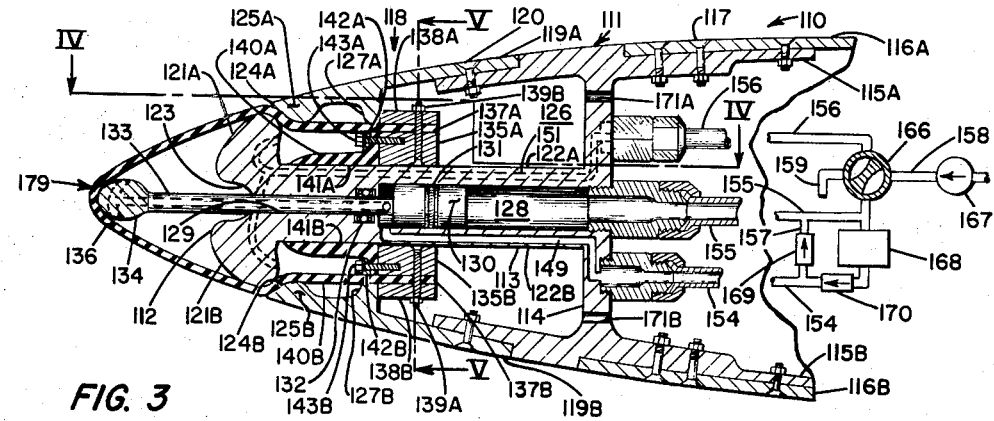
FIG. 3
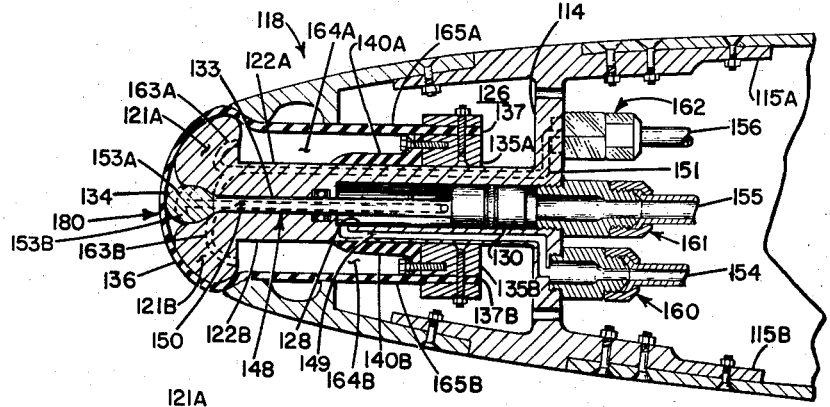
FIG. 6
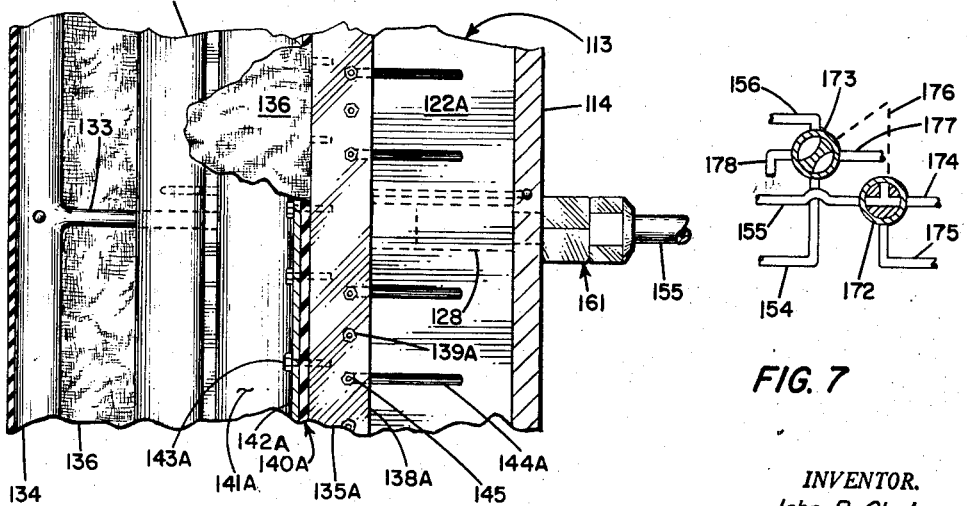
FIG. 4
FIG. 7
INVENTOR.
John R. Clark
BY
W. R. Robertson
AGENT United States Patent Office 2,851,229
Patented Sept. 9, 1958

2,851,229

VARIABLE-CONTOUR AIRFOIL

John R. Clark, Dallas, Tex., assignor to Chance Vought Aircraft, Incorporated, Dallas, Tex., a corporation of Delaware Application May 3, 1956, Serial No. 582,408

23 Claims. (Cl. 244—44)

The present invention relates to variable-camber airfoils and aircraft wings and more particularly to an improved leading edge construction and arrangement for changing the contour of the leading edge of an airfoil.

It is frequently desirable in aircraft to vary the profile or contour of an airfoil or wing in order to change its flight characteristics under certain operating conditions. A number of arrangements have heretofore been proposed for varying the contour or camber of an airfoil, especially in its leading edge portion, and the present invention is directed to an improved airfoil leading edge with a controllable nose contour which, in response to pilot-operated or automatic control, is caused to assume either a sharp, short-radius nose profile or alternatively a blunter, longer-radius profile. The sharp profile is particularly well adapted for high-speed supersonic flight, and the blunt profile serves to increase the lift-drag ratio of the airfoil and to decrease tendencies toward leading edge stall during take-off, landing, low speed level flight, and maneuvers at low speeds. The blunt leading edge profile is also particularly well adapted for combat maneuvers imposing relatively high "$g$"-loads as well as for flight with positive angle of attack at relatively high subsonic Mach numbers, as in the range of Mach 0.9.

The improved controllable nose contour arrangement of the present invention includes: a flexible diaphragm or skin arranged to cover exterior surfaces of the airfoil nose and to extend through a slotted opening or openings in the airfoil surface into a chamber contained therein; retracting means attached to at least one edge of the diaphragm within the airfoil chamber; means for extending the diaphragm outwardly from the airfoil fixed nose surfaces; and control means for governing the application of fluid pressure to the extending and retracting means for effecting extension and retraction of the diaphragm at the will of an operator of the aircraft. The means for extending the diaphragm includes a passage in the airfoil having connection with a source of compressed air or other gases and communicating with the inner surface of the diaphragm and the airfoil nose outer surface covered thereby for admitting air, as supplied by the control means, under pressure therebetween, and in one form of the invention further includes an elongated body which is mounted in spanwise relation on the airfoil nose beneath the diaphragm and adapted for forward extension from the nose. When the extending means is energized by the control means, the retracting means allows a part of the diaphragm to be pulled out of the chamber through the slot (or slots) in order that the diaphragm may be extended; when the retracting means is actuated, the extending means passively allows the diaphragm to be pulled into the chamber by the retracting means until the diaphragm portion remaining outside the chamber is in close, smooth contact with the airfoil nose surfaces covered thereby. In its extended position, the flexible diaphragm forms a particular contour well adapted for flight at certain aspect ratios and airspeeds, and is rendered firm and stable in shape by the pressure of the air admitted between the diaphragm and the nose surface covered by the diaphragm. When retracted, the diaphragm forms a second, or basic, nose contour which is better adapted for flight at other speeds. In one form of the invention, the nose contour of the airfoil is controllable for selectively forming either the sharp, short-radius profile or a blunter, longer-radius profile provided with a drooped portion which provides flight characteristics of a desirable nature under certain operating conditions. In a modified form of the invention, the nose contour may be selectively varied between a sharp, short-radius profile and a blunter, longer-radius profile without any drooped portion. The flexible diaphragm forms an extendible, sheath-like or bag-like structure which is light in weight, inflatable, retractable, and capable of containing relatively high internal pressures to provide a firm contour of the desired shape. Any desired material having sufficient strength, flexibility, and imperviousness may be used for making the diaphragm. Such materials, to quote two examples, include thin metal and various sorts of coated or impregnated cloths.

It is, accordingly, a major object of this invention to provide an improved variable camber construction and mechanism for varying the contour of the leading edge of an airfoil or wing by the use of an extendible diaphragm covering surfaces of the airfoil leading edge.

Another object of this invention is to provide a variable contour mechanism which is simple in construction and operation and light in weight.

A further object is to provide a variable contour mechanism which is capable of providing either a sharp, short-radius nose profile adapted for supersonic flight or a blunt, longer-radius profile which increases the lift-drag ratio of the airfoil and is more particularly adapted for takeoff, landing, and low-speed maneuvers.

A still further object is to provide a variable contour arrangement of the character thus far stated which when providing a blunt, longer-radius profile concurrently provides a drooped structure on the airfoil nose.

Yet another object is to make available a variable contour arrangement utilizing a flexible airtight member formed by a diaphragm, portions of which diaphragm may be drawn into a recess in the airfoil in the retracted basic profile condition and extended outwardly from the airfoil to provide a different predetermined leading edge profile in the extended arrangement.

Other objects and advantages will be apparent from the specification and claims, and from the accompanying drawings which illustrate an embodiment and one modified form of the invention.

In the drawings:

Figure 1 is a cross-sectional view of the leading edge of an airfoil with the variable-contour mechanism shown in its extended condition;

Figure 2 is a similar view of the same with the variable-contour mechanism shown in its retracted position;

Figure 3 is a cross-sectional view of a modified form of the invention with the contour-changing member shown in its extended position;

Figure 4 is a plan view of a portion of the airfoil leading edge taken along the line IV—IV of Figure 3, most of the diaphragm being omitted to show the nosepiece, main structural member, and retraction bar;

Figure 5 is a longitudinal sectional view taken along the line V—V of Figure 3;

Figure 6 is a cross-sectional view similar to Figure 3 and showing the contour-changing member in its retracted position; and Figure 7 is a diagrammatic view showing a modified form of control means usable with the contour-changing arrangement of Figures 3 and 6.

With initial reference to Figures 1 and 2, the numeral 20 indicates the forward position of an aerodynamic surface, such as a wing or other airfoil, comprising a spanwise-extending forward structural member or beam 21. The beam 21, which is generally I-shaped in cross-section, has a vertically extending web 22 and generally horizontally extending upper and lower flanges 23, 24. A wing rib 28 mounted on and extending generally aft from the main beam 21 comprises a vertical web 30 and upper and lower flanged members 33, 34 having outer legs 35, 36 whose faces are flush with corresponding flanges 23, 24 of the main beam 21 and whose respective contours define a desired basic profile of the airfoil portion occupied by the rib 28. The flanged member inner legs 37, 38 lie against and extend substantially the length of corresponding upper and lower edge portions of the web 30, to which they are rigidly attached as by rivets 39. At its forward end, the wing rib 28 is rigidly attached to the aft side of the main beam 21 by means which may include a flanged member (not shown) similar to the upper and lower flanged members 33, 34 and attached to the beam 21 and rib 28 by rivets 39.

Attached by usual means to the wing rib 28 at a point somewhat aft of the main beam 21 is an auxiliary beam 40 extending, as structural considerations may dictate, spanwise or diagonally in the airfoil 20 and provided with a vertical web 41 and top, bottom, and end flanged members 42, 43, 44. The upper surface of the airfoil 20 aft of the main beam 21 is formed by an upper wing panel 48 suitably attached by rivets 47 or other fasteners to the main beam 21, wing rib 28, and auxiliary beam 40. The lower surface of the airfoil 20, between the main and auxiliary beams 21, 40, is formed by an aft access panel 51 which, for removability, is preferably attached to the main and auxiliary beams 21, 40 and the rib lower flange 34 by removable fastening means 52, while the airfoil lower surface aft of the auxiliary beam 40 is formed by a lower wing panel 49 which is attached to the auxiliary beam 40 and to the wing rib 28 by any suitable method.

The nose section 53 of the airfoil 20 includes a nose rib 29 mounted on and extending generally forwardly from the main beam 21, a fixed skin 54, and a forward access panel 50. The nose rib 29 has T-sectional upper and lower members 56, 57 which have respective inner, vertical legs 58, 59 and outer cross-portions 60, 61, the latter at their aft ends lying flush with corresponding flanges 23, 24 of the main beam 21 and conforming throughout most of their length to the desired general basic contour of the nose section 53. The upper member 56 extends short of the nose section leading edge 27 to leave room for an air channel 76 (to be described), and the forward end of the lower member 57 lies somewhat aft of that of the upper member 56. Rigidly attached to and extending slightly forwardly and upwardly from the forward end of the lower member crossportion 61 is a guide member 55 which extends spanwise along the airfoil nose section 53 and, in the sectional view shown in the referenced figure, has a smooth, bulbous forward-end contour. Near its forward end, the upper member crosspiece 60 is joggled downwardly at two places 62, 63. The nose rib upper and lower members 56, 57 are connected by an aft web 31 which is attached thereto by fasteners 39 and further attached to the main beam web 22, in a manner similar to the attachment of the auxiliary beam 40 to the wing rib web 30, by means including suitable fasteners 39. The aft web 31 extends forwardly as far as is possible without interfering with certain later-described moving parts, and is provided with a forward-edge clearance cut-out 64. Because they are not connected throughout their lengths by webbing, the construction of the upper and lower members 56, 57 accordingly must be such as will endow them with somewhat extra strength and rigidity; this may be accomplished by making their respective vertical legs 58, 59 amply wide and of sufficient thickness in order that they may withstand operational forces placed upon them.

A reinforcing or supporting member 65 is rigidly attached by suitable fasteners 39 to the forward end of the upper member vertical leg 58 and extends downwardly therefrom so that its two ends are symmetrically disposed on opposite sides of the basic chordline of the nose section 53. The supporting member 65, which may be of L or T section, has a spanwise-pointing leg 66 whose forward face lies flush with the forward end of the upper member 56, and a chordwise-pointing leg 67 which extends from the first leg 66 to the neighborhood of the forward joggle 62. Rigidly joined to and extending aft from the lower end of the supporting member 65 is an attachment piece 68 which, like the lower member 57, may be of T-section and hence provided with an upwardly pointing vertical leg and generally horizontal cross-piece, the latter lying flush within the nose profile or contour and having a lower joggle 69 which is in fore-and-aft alignment with the upper member forward joggle 62. The forward end of the attachment piece 68 is aligned with the forward end of the upper member 56. The aft end of the attachment piece 68 approaches the forward end of the lower member 57 and is separated therefrom by an interval sufficient to provide a certain clearance, the necessity and extent of which will become evident. The upper member 56, attachment piece 68, and supporting member 65 are interconnected by a forward web 32 rigidly attached thereto by suitable fasteners 39. the aft edge 70 of the web 32 is trimmed to provide clearance for a moving part to be described.

The nose section 53 has a U-section member 71 which extends spanwise therethrough. The U-section member 71 has a vertical leg 72 whose aft face lies against the respective forward ends of the upper member 56 and attachment piece 68, and further has rearwardly extending legs 73 whose inner faces fay with the corresponding outer faces of the upper member 56 and attachment piece 68 and whose aft ends mate respectively with the forward joggle 62 and lower joggle 69, the gage of the U-channel member being such that the aft ends or edges of its rearwardly pointing legs 73 lie flush with and in effect form continuations of corresponding outer surfaces of the upper member 56 and attaching piece 68 at the forward joggle 62 and lower joggle 69.

The nose section is covered by the fixed skin 54 and a forward access panel 50. The fixed skin 54 extends forwardly from the upper wing panel 48, is attached by fasteners 18 to the main beam 21 and by any suitable means to the upper member crosspiece 60, and conforms to the desired fixed contour of the nose section 53 as far forward as the aft joggle 63. At this point, the skin 54 angles downwardly, then forwardly, to conform to the joggle 63, next extends forwardly in contact with the upper member crosspiece 60, then the U-section member upper leg 73, and therefrom proceeds forwardly and downwardly to the leading edge 27; curving with comparative sharpness at the latter, it extends aft and downwardly, and terminates at the nose section undersurface at a location flush with or slightly aft of the aft end of the attachment piece 68, being forwardly spaced from the latter to provide therebetween a clearance whose need and extent will become evident. The fixed skin 54 is attached to underlying parts by suitable fastening means, and its lower aft edge is smoothly rounded. An opening 75 is provided through the skin 54 below and aft of the leading edge 27 at a point forward of the U-section member 71, and additional, similarly located openings may be provided at intervals along the spanwise length of the U-section member 71. Together with the U-section member 71, the skin 54 forms a channel 76 which extends spanwise along the leading edge 27 and which should be made airtight so that no air or other fluids may enter or leave it except through the skin openings 75 and through air supplying means to be described.

The undersurface of the airfoil 20 between the fixed skin 54 and aft access panel 51 is formed by the forward access panel 50, which panel is attached to the main beam 21 and nose rib lower member 57 by fasteners 77 that preferably are readily removable so that the forward panel 50 may conveniently be removed when access to the interior of the nose section 53 is desired. The forward edge of the forward access panel 50 is smoothly rounded and is approximately flush with the forward end of the lower member 57, and consequently is spaced a little rearwardly of the lower aft edge of the fixed skin 54, thus forming a spanwise slot 78 along the underside of the nose section 53 aft of the leading edge 27 which communicates between the exterior and interior of the airfoil nose section 53. The slot 78 should be wide enough to accommodate snugly, but slidingly, a diaphragm 79 to be described.

It will thus be seen that the airfoil of the invention comprises, as described to this point, fixed structural members 21, 40 covered by skins 48, 49, 54 and removable panels 50, 51 which form the fixed external surface of the airfoil 20 and enclose a chamber contained therein. A spanwise slot 78 passes through the lower outer surface of the airfoil and opens into the airfoil interior. The upper and lower fixed surfaces of the nose section 53, formed by the fixed skin 54 and forward access panel 50, are substantially symmetrical about the nose section chord-plane, and the curvature of the skin 54 at the leading edge 27 is of relatively short radius; consequently, the basic profile of the airfoil nose section 53, as defined by its fixed surfaces, is typified by a sharp, short-radius contour about the leading edge 27 and by the absence of nose droop. A channel 76 isolated from the rest of the airfoil interior is located in the airfoil between the leading edge 27 and the slot 78, and an opening or series of openings 75 provide communication between the inside and outside of the channel through a fixed surface 54 of the airfoil. The description of the nose section continues below.

With particular reference to Figure 2, an inflatable, extendible leading edge member consisting of a flexible diaphragm 79 is attached by a rigid retaining strip 80 and fasteners 81 to the fixed skin 54 in abutment with the forward joggle 62. The diaphragm 79 is wrapped snugly around and under the leading edge 27 and extends slideably through the slot 78 into the interior of the nose section. The aft edge of the retaining strip 80 is of such thickness that it, together with the aft edge of the diaphragm 79, exactly fills the step or offset in the fixed skin 54 forward of the joggle 63, and is tapered toward its forward edge so that it blends smoothly into the outer surface of the diaphragm 79; accordingly, the resulting structure is flush and streamlined. Lying closely against the fixed skin 54, the diaphragm 79 assumes the sharp, short-radius contour thereof, and forms the outermost forward surface of the leading edge portion of the nose section 53. The inner surface of the diaphragm 79 has communication through the skin opening 75 with the leading-edge channel 76. It will be understood that the flexible diaphragm 79 extends spanwise along the airfoil 20 and preferably covers substantially the entire length of the leading edge 27 thereof. The diaphragm 79 is suitably attached and sealed in an airtight manner at its inboard and outboard ends, and is sealedly attached as described above at its upper edge by the retaining strip 80. Sealing of the diaphragm 79 at the slot 78 is effected, as will be explained, by the lower aft edge of the fixed skin 54 and by the bulbous guide member 55. The retaining strip 80 and guide member 55 preferably are coextensive, in a spanwise direction, with the diaphragm 79.

With continued reference to Figure 2, the retracting means of the presently described embodiment of the invention includes an actuator 82 and a roller assembly 83. The actuator 82 may be of any sort which will produce the desired work, and may be powered mechanically, electrically, by fluid pressure, etc. The preferred actuator 82 of the example is a hydraulic cylinder whose barrel 84 is pivotally mounted by a bolt 85 on a fitting 86 rigidly mounted on the forward face of the auxiliary beam 40 by suitable fasteners 87, and whose piston rod 88 extends forwardly through a slotted clearance opening 25 provided for the rod 88 in the main beam web 22. The actuator 82 illustrated is of the single-acting type, and its barrel 84 has near its forward end a port into which a hydraulic line 89 is connected through a fitting 95. The auxiliary beam web 41 is provided with a passthrough opening 46 for the hydraulic line 89. When hydraulic pressure is applied to the barrel 84 through the line 89, the piston rod 88 retracts into the barrel 84. Although a single-acting actuator 82 hydraulically capable only of retraction is illustrated and described, it may conceivably be desirable, in some applications, that the actuator be actively capable of extension as well. In such cases, a double-acting hydraulic cylinder or equivalent should of course be provided.

The roller assembly 83 includes a mounting bracket 96 whose foot 97 is rigidly mounted on the main beam web 22 by fasteners 87 and which has a forwardly extending arm 98, the roller assembly further including a roller 99 pivotally mounted on the arm 98 by a shaft 100. The roller 99 may be cylindrical or, as illustrated, partially cylindrical, and preferably is coextensive in a spanwise direction with the diaphragm 79, whose aft edge is firmly attached on the aft peripheral edge of the roller 99 by suitable retaining means such as the mounting strip 10 and fasteners 11. The mounting strip 10 extends along the entire aft edge of the diaphragm 79, the latter lying between the strip 10 and roller 99, and is attached to the roller 99 by the fasteners 11 which, when tightened, cause the strip 10 to clamp the diaphragm 79 firmly and securely against the roller 99. A rigid arm 12, which may be integral with the mounting strip 10, extends outwardly from the roller 99 and is pivotally attached by a bolt 85 to the actuator rod 88. An upward extension 13 which is provided on the roller mounting bracket arm 98 and which may be integral therewith is located and dimensioned in such manner as to serve as a stop for limiting rearward rotation of the roller 99 to a range proper for effecting complete retraction of the diaphragm 79. At the rearward end of this range of rotation, the arm 12 strikes the stop 13 and is thereby halted.

The diaphargm 79 is extended, as will be described, by forcing air or other fluid under pressure into the channel 76 and thence, through the skin opening 75, against the inner surface of the diaphragm 79. A tube attachment fitting 74 is mounted and sealed in a suitable opening made through the U-section member vertical leg 72 and the supporting member spanwise leg 66 to form a fore-and-aft passageway leading into the channel 76, and an air pressure tube 92 is connected to the fitting 74, which extends aft of the channel 76. The tube 92 extends aft through a clearance opening 26 provided therefor in the main beam web 22 and through a similar opening 45 in the auxiliary beam web 41. As explained below, the tube 92 is connectable to a source of compressed air.

Referring now to Figure 1, a typical control means for the presently described embodiment of the invention includes a pneumatic valve 14 and a hydraulic valve 15. The three-way pneumatic valve 14 is connected by a line 93 through a check valve 16 with a source of compressed air and through the line 92 with the channel 76. The pneumatic valve 14 has an exhaust port which may be provided with a tube 94 whose purpose is to conduct exhaust air from the valve 14 and dump it in a convenient location.

The three-way hydraulic valve 15 is connected to a source of hydraulic pressure through a pressure line 90, to a hydraulic reservoir or equivalent through a return line 91, and to the actuator barrel 84 through the barrel line 89. Where not otherwise contraindicated, the pneumatic and hydraulic valves 14, 15 may conveniently be linked by a mechanical linkage, represented by 17, in such manner that when the pneumatic valve 14 is positioned for connecting the air pressure line 93 to the channel line 92, the hydraulic valve 15 is simultaneously positioned for connecting the hydraulic return line 91 to the barrel line 89. Similarly, positioning the pneumatic valve 14 to connect the channel line 92 to the exhaust line 94 effects simultaneous positioning of the hydraulic valve 15 for connecting the barrel line 89 to the hydraulic pressure line 90.

When, as shown in Figure 1, the valves 14, 15 are positioned so that the channel line 92 is connected to the pneumatic pressure line 93 and the barrel line 89 to the return line 91, fluid pressure is applied to the inner surface of the diaphragm 79 which is consequently forced away from the fixed skin 54, thereby exerting a pull on the roller 99 at the aft edge of the diaphragm 79 which rotates the roller 99 forwardly until the piston rod 88 is fully extended, pulls the retracted portion of the diaphragm 79 through the slot 78 out of the interior of the airfoil 20, and fully inflates the diaphragm 79. The pull exerted on the diaphragm 79 holds it tightly against the guide member 55 and the rounded lower aft edge of the fixed skin 54, thus sealing the slot 78 and preventing the passage of air therethrough on either side of the diaphragm 79. The inflated diaphragm 79 forms a partly cylindrical inflated bag 19 which is relatively rigid because of the air pressure therein and which extends spanwise of the airfoil 20 at the leading edge 27 thereof, most of the bag 19 lying immediately under the basic chordline of the nose section 53 and thus imparting to the airfoil 20 a blunt, drooped, leading edge profile.

When the pneumatic valve 14 is rotated to the position connecting the channel line 92 to the exhaust line 94, thereby releasing air pressure in the channel 76 into the exhaust line 94, the linkage 17 simultaneously moves the hydraulic valve 15 to the position effecting connection of the barrel line 89 to the hydraulic pressure line 90, thus causing the piston rod 88 to exert an aftward force on the roller arm 12 which rotates the roller 99 rearwardly and pulls the aft edge of the diaphragm 79 further into the interior of the nose section 53 through the slot 78 until the diaphragm 79 is pulled taut and tight against the fixed skin 54 as shown in Figure 2. At this point, further retraction of the piston rod 88 is halted by the stop 13, and the nose profile of the airfoil 20 conforms to the sharp, short-radius nose profile established by the fixed skin 54 and forward access panel 50. Held taut by the roller 99, the diaphragm 79 is pulled tightly against the rounded lower aft edge of the fixed skin 54 on its inner side and against the rounded end of the guide member 55 on its outer side, thereby sealing the slot 78 against the passage of air into or out of the interior of the airfoil 20. The roller arm 12 is locked against the stop 13 by hydraulic pressure in the barrel 84.

Referring now to Figure 3, the numeral 110 refers to a wing or airfoil of which only the forward portion is shown. The airfoil 110 has a main forward structural member 111 which is generally T-shaped in cross-section with the stem 113 of the T extending forwardly or chordwise and terminating at the leading edge 112, and the crosspiece 114 of the T extending vertically and terminating in upper and lower flanges 115A, 115B. The upper and lower outer surfaces of the airfoil 110 aft of the crosspiece 114 are formed by upper and lower wing panels 116A, 116B respectively attached by fasteners 117 to the upper and lower flanges 115A, 115B. The airfoil nose portion 118 lies forward of the crosspiece 114 and includes upper and lower panels 119A, 119B respectively attached to the upper and lower flanges 115A, 115B by fasteners 120 which preferably are removable in order that, if the need should arise the panels 119A, 119B may each be removed to provide access to the interior of the nose portion 118.

The horizontal or chordwise-extending central stem portion 113 of the T-shaped member 111 is provided with enlarged or bulbous end portions 121A, 121B at the leading edges of its upper and lower faces or portions 122A, 122B, respectively. The stem portion upper and lower faces 122A, 122B, between the enlargements 121A, 121B and the vertical crosspiece, should preferably be smooth, flat, and mutually parallel to provide good sliding and sealing surfaces for elements to be described.

Symmetrically spaced to either side of the chordplane of the nose section 118, the outer faces of the bulbous portions 121A, 121B conform, in underlying relation, to a desired blunt, long-radius leading edge contour of the nose section 118, and the interval between the mutually facing central sides of the upper and lower bulbous portions forms a spanwise groove or channel 123 in the leading edge of the airfoil 110. The forward edges of the nose panels 119A, 119B are separated by an interval or gap which is partially filled by the bulbous enlargements 121A, 121B, an upper slot or gap 124A being left between the upper panel forward edge 125A and the upper enlargement 121A, and a similar lower gap or slot 124B being left between the lower panel forward edge 125B and lower enlargement 121B. The panel forward edges 125A, 125B are smoothly rounded, as are the opposite, matching edges of the enlargements 121A, 121B, and the panel forward edges preferably lie a little aft of the enlargements so that the upper slot 124A extends downwardly and aft while the lower slot 124B extends upwardly and aft from the exterior into the interior of the nose section 118.

From the above, it will be apparent that the airfoil 110 comprises a main structural member 111 which supports the wing and nose section upper and lower skins or panels 116A, 116B, 119A, 119B, and that the forward end of a forwardly extending stem portion 113 of the main structural member has end enlargements 121A, 121B which lie between the spaced-apart respective forward edges 125A, 125B of the upper and lower nose panels 119A, 119B. The nose panels 119A, 119B, enlargements 121A, 121B, and vertical crosspiece 114 together enclose an airfoil cavity or chamber 126 open to the outside of the airfoil 110 through the lower leading-edge slot 124B lying between the lower enlargement 121B and the lower panel rounded forward edge 125B and through the similar upper leading-edge slot 124A between the upper enlargement 121A and upper panel forward edge 125A.

Aft of its rounded forward edge 125A, the nose upper panel 119A has a protuberance 127A which extends downwardly therefrom toward the central stem portion 113, and the lower panel 119B has a similar, upwardly extending protuberance 127B preferably located in fore-and-aft alignment with the upper protuberance 127A. These protuberances 127A, 127B constitute stops for limiting the forward travel of moving parts to be described.

The T-shaped member 111, in order that it may house parts of the invention to be described, is provided with a preferably cylindrical passageway 128 which extends forwardly from the aft side of the crosspiece 114 through the crosspiece and into the stem portion 113, and terminates at a location roughly in register with the stops 127A, 127B. A straight guide passage 129 of smaller diameter than the cylindrical passageway 128 opens at its aft end into the latter and extends forwardly therefrom into the channel 123 lying between the bulbous enlargements 121A, 121B.

A rod 133 slideably mounted in the guide passage is extendible therefrom between the enlargements 121A, 121B and extends into the cylindrical passageway 128. A piston 130 provided with a packing 131 is slideably mounted in the cylinder 128 and may be rigidly attached to the aft end of the rod 133. Packings 132 installed in a recess cut into the guide passage wall encircle the rod 133 and prevent fluid leakage along the latter.

Integral with or securely attached on the forward end of the rod 133 is a spanwise-extending nosepiece 134 whose cross-sectional shape is such that its aft side preferably complements and readily nests into the channel 123, while its forward portion is sharply rounded to correspond to the leading edge profile of a sharp, short-radius airfoil nose contour to be described.

Within the airfoil interior 126, the upper edge 137A of a flexible, substantially impermeable diaphragm 136 lies aft of the upper stop 127A and above the stem portion upper face 122A. From its upper edge 137A, the diaphragm 136 extends forwardly past the upper stop 127A and out of the airfoil interior through the upper leading-edge slot 124A, passes forwardly and downwardly over the upper enlargement 121A and nosepiece 134, continues rearwardly and downwardly from the latter to the lower enlargement 121A, and again enters the interior of the airfoil through the lower leading-edge slot 124B. Extending rearwardly from the lower slot 124B into the airfoil, the lower portion of the diaphragm 136 terminates at its lower edge 137B, the latter lying below the stem portion 113 and aft of the lower stop 127B. The diaphragm 136 is slideable forwardly and rearwardly through the slots 124A, 124B, and its thickness relative to the widths of the slots 124A, 124B should be such as to make it relatively snug but still freely slideable within the slots.

An upper guide bar 135A extending spanwise within the nose section interior 126 is movably mounted on the upper face 122A of the T-shaped member's stem portion 113 by means described below. The lower face of the guide bar 135A, in order that it may be easily movable forwardly and rearwardly over the stem portion 113, should be smooth. An upper, rearward portion of the diaphragm 136 overlies the upper face of the upper guide bar 135A, the diaphragm upper, aft edge 137A lying flush with the aft side of the guide bar. The diaphragm 136 is sealingly attached to the guide bar 135A by means such as a retainer strip 138A and suitable fasteners 139A. Lying between the retainer strip 138A and the guide bar 135A, the diaphragm 136 is clamped against the latter when the fasteners 139A, which pierce the retainer 138A, diaphragm, and bar 135A, are tightened. A lower guide bar 135B (the same being an inverted counterpart of the upper guide bar 135A) is movably mounted against the stem portion lower face 122B between the lower stop 127B and vertical crosspiece 114, and coacts with a lower retainer strip 138B and clamping fasteners 139B for securely and sealingly receiving and holding the lower edge 137B of the flexible diaphragm 136.

A flexible seal 140A having a forwardly extending foot whose smooth, flat lower surface 141A presses closely against the stem portion upper face 122A is mounted on the forward face of the upper guide bar 135A by mounting means which may include a retainer strip 142A clamping the seal against the guide bar and held in place by fasteners 143A. A similar seal 140B is similarly attached to the forward face of the lower guide bar 135B by a retainer strip 142B and fasteners 143B. The seals 140A, 140B prevent leakage between faying surfaces of the stem faces 122A, 122B and guide bars 135A, 135B.

With added reference to Figure 4, the T-shaped member's crosspiece 114 and stem portion 113, including the stem portion enlargements 121A, 121B, extend spanwise along the length of the airfoil nose section 118, as do the upper and lower nose panels 119A, 119B, slots 124A, 124B, diaphragm 136, nosepiece 134, guide bars 135A, 135B, diaphragm retainer strips 138A, 138B, seals 140A, 140B, and seal retainer strips 142A, 142B. The diaphragm 136, most of the upper half of which is shown as cut away in Figure 4, is suitably sealed at its inboard and outboard ends so that it forms an airtight, bag-like member closed at its aft extremity by the guide bars 135A, 135B, seals 140A, 140B, and stem portion 113. The stem portion upper face 122A, which is a smooth, flat surface extending forwardly from the vertical crosspiece 114 to the upper enlargement 121A, is pierced by a series of straight, mutually parallel guide slots 144A of equal length which run fore-and-aft relative to the airfoil 110, are spaced apart along the spanwise length of the upper face 122A, and are all located substantially the same distance forward of the vertical crosspiece 114. Other cylinders such as the cylinder 128 shown may be provided at intervals along the length of the stem portion 113 and should be supplied with guide passages, pistons, and piston rods such as designated respectively by the numerals 129, 130, 133 in Figure 3, and the piston rods should of course be connected at their forward ends with the nosepiece 134. No guide slots 144A, of course, are provided in the actual area occupied by any cylinder such as 128.

A guide bolt 145 pierces the diaphragm upper retainer 138A and the underlying diaphragm 136 and upper guide bar 135A at each guide slot 144A and extends downwardly through the slot 144A. The fasteners 143A employed for attaching the seal retainer 142A and upper seal 140A to the upper bar 135A are preferably spaced between the diaphragm-attaching fasteners 139A and the guide bolts 145 or made short enough to preclude interference therewith. The seal foot 141A forms a flexible flap which presses slidingly down on the stem upper face 122A along the length of the guide bar 135A. Typical also of the lower enlargement 121B, the surfaces of the upper enlargement 121A are smooth and uniform, as are the surfaces of the nose piece 134. Although not seen in Figure 4, the stem lower face 122B is similar to the upper face 122A, and the lower seal 140B is similar to the upper seal 140A described.

Referring now to Figures 4 and 5, the stem portion 113 may be made in one solid piece between its upper and lower faces 122A, 122B, but for the sake of lighter weight is preferably hollowed out as much as expedient between those faces 122A, 122B from the vertical crosspiece 114 to the enlargements 121A, 121B. Such hollowing, which should leave ample material around the cylinders of which 128 is an example, results in the formation of upper and lower face plates 146A, 146B connected at the enlargements 121A, 121B by a forward wall 147. The guide slots 144A already mentioned, which pass through the upper face plate 146A, are respectively aligned and paired with equivalent slots 144B extending through the lower face plate 146B. The fasteners which clamp the diaphragm retainers and diaphragm to the upper and lower guide bars must be of a type, such as the countersunk-head fasteners 139A, 139B illustrated, which will not detract from the slideability of the guide bars 135A, 135B on the upper and lower faces 122A, 122B. The guide bolts 145 extend through the diaphragm 136, upper and lower diaphragm retainers 138A, 138B, and the guide slots 144A, 144B, one bolt 145 passing through each slot pair consisting of an upper slot 144A and a lower slot 144B. For clarity, the sizes of the slots 144A, 144B are exaggerated in Figure 4; these slots should be of such size as to allow free fore-and-aft motion, but virtually no lateral motion, of the guide bolts 145 therein. When the guide bars 135A, 135B are moved so that the guide bolts 145 move toward the rear ends of the slots 144A, 144B, the upper and lower edges 137A, 137B of the diaphragm 136 are moved rearwardly with the guide bars and the diaphragm is accordingly pulled into the cavity 126 enclosed by the nose section 118 until it is pressed in taut, smooth contact with the enlargements 121A, 121B and retracted nosepiece 134 as shown in Figure 6. The slots 144A, 144B must extend rearwardly far enough to allow full retraction of the diaphragm 136 to the position specified above. When the diaphragm 136 is extended, by means to be described immediately below, the guide bars 135A, 135B are moved forward until they strike the respective stops 127A, 127B which should be so located as to allow full extension of the diaphragm 136 to its position shown in Figure 3. The slots 144A, 144B should be at least long enough in a forward direction to allow the guide bars 135A, 135B to move forwardly to the stops 127A, 127B. To prevent leakage through the slots 144A, 144B when the diaphragm 136 is retracted, the forward edges of the upper and lower seals 140A, 140B must extend forward of the slots in all operating positions of the guide bars 135A, 135B.

The means for positioning the diaphragm 136 will now be described. Referring first to Figure 6, in which figure the diaphragm 136 is shown in its retracted position, the diaphragm positioning means comprises extending means and retracting means. The extending means is actuated by fluid pressure and includes an extending passageway 148 communicating between an air source and the inner surface of the diaphragm 136. The extending passageway 148 may be of composite nature, and in the illustrated example includes: first, a lower passageway 149 leading from the aft face of the T-shaped member's vertical crosspiece 114 through the crosspiece and stem portion 113 into the forward end of the cylinder 128; second, the portion of the cylinder 128 between the forward end thereof and the forward face of the piston 130; and third, an axially formed passage 150 in the piston rod 133. The last-named passage 150 communicates, through an opening through the wall of the rod 133 near the aft end thereof, with the interior of the cylinder 128, and at its forward end extends into the nosepiece 134 where it divides into two branches 153A, 153B which respectively open through the upper and lower surfaces of the nosepiece 134 to the inner surface of the diaphragm 136. Air or other fluid is supplied to the extending passageway 148 by control means (to be described) through a first line 154 which is connected into the aft end of the lower passageway 149 by fittings 160. The extending means also includes the nosepiece 134 and the fluid motor comprising the cylinder 128, piston 130, and piston rod 132. The cylinder 128 is supplied with air or other fluid at its aft end by a second line 155 connected by suitable fittings 161 into the cylinder at the aft face of the crosspiece 114. The cylinder and piston rod must be of such respective lengths as to permit full extension of the nosepiece 134 in the extended position of the diaphragm 136 and full seating of the nosepiece between the upper and lower enlargements 121A, 121B when the diaphragm is retracted by means which will now be described.

The retraction means is actuated by fluid supplied under pressure through a third line 156, and includes a divided passageway 151 and a fluid motor. The divided passageway 151 opens through the aft face of the vertical crosspiece 114, is connected into by the third line 156 through suitable fittings 162, extends into the stem portion 113 and forwardly therethrough to the enlargements 121A, 121B, and divides into upper and lower branches 163A, 163B which open respectively through the aft faces of the upper and lower enlargements 121A, 121B. The fluid motor comprises an upper, variable-dimension, airtight chamber 164A formed jointly by the seal 140A carried by the upper guide bar 135A, the stem upper face 122A, the aft surface of the upper enlargement 121A, and the upper diaphragm upper retractable portion 165A, and further comprises a similar lower chamber 164B bounded by corresponding parts of the seal 140B carried by the lower guide bar 135B, the stem lower face 122B, lower enlargement 121B, and lower retractable portion 165B of the diaphragm 136. Air or other fluid is admitted into and out of the upper and lower variable-dimension, airtight chambers 164A, 164B through the divided passageway 151 and third line 156 by control means which will presently be described.

With reference now to Figure 3, a typical control means for the modification shown therein comprises a single four-way selector valve 166 receiving air or other fluid from a suitable source of fluid pressure through a pressure line 158 and check valve 167. The selector valve 166 should have an exhaust port provided with a vent or exhaust line 159, and is connected to the divided passageway 151 by the line 156, to the cylinder 128 through the line 155, and to the lower passageway 149 through a pressure regulator 168, check valve 170, and line 154. The cylinder line 155 and lower passageway line 154 are preferably connected, between the pressure regulator 168 and cylinder 128, by a bypass line 157 containing a bypass check valve 169 permitting one-way fluid flow from the lower passageway line 154 to the cylinder line 155. The other check valve 170, used in the lower passageway line 154 between the bypass line 157 and the regulator 168, prevents backflow to the regulator.

The selector valve 166 is rotatable to a first position in which it simultaneously connects the pressure line 158 to the cylinder and lower passageway lines 155, 154 and the divided passageway line 156 to the vent line 159, and to a second position in which the vent line 159 is connected to the cylinder line 155 and the pressure line 158 to the divided passageway line 156. The pressure regulator 168 may be any one of a number of well-known commercially available models which will limit air pressure in the lower passageway line 154 to a value producing a desired pressure against the inner surface of the diaphragm 136 when the latter is extended. If the regulator 168 chosen allows a reverse airflow therethrough without damage to the regulator, the bypass line 157 and the bypass and regulator check valves 169, 170 may be omitted. Where no reverse flow is possible or desirable through the regulator 168, use of the check valves 169, 170 and bypass line 157 or equivalent means of bypassing exhaust air in the lower passage line 154 away from the regulator 168 is necessary. The exhaust line 159 may conduct exhaust air to any convenient location in which the air may be discharged. Upper and lower vent openings 171A, 171B should be provided through the vertical crosspiece 114 for equalization of air pressures on the forward and aft sides of the crosspiece when the diaphragm 136 is extended or retracted.

When the control means selector valve 166 of Figure 3 is placed in its first position (that is, the position illustrated), the pneumatic pressure line 158 associated therewith is connected to the cylinder line 155 and, via the pressure regulator 168, to the lower passageway line 154. Airflow through the lower passageway 149, the forward end of the cylinder 128, and the piston rod passageway 150 to the inner surface of the diaphragm 136 tends to inflate the diaphragm and to force it outwardly away from the upper and lower enlargements 121A, 121B. The pressure regulator 168 limits the fluid pressure in the lower passageway line 154 to a desired value which is less than that of the pressure in the pneumatic pressure line 158, and keeps the fluid pressure against the diaphragm 136 from rising above that necessary for extension and rigid inflation of the diaphragm. At the same time, airflow at unreduced pressure enters the cylinder 128 from the cylinder line 155 and forces the piston 130, rod 133, and nosepiece 134 forward; meanwhile, the variable-dimension chambers 164A, 164B (Figure 6) of the retracting means are connected through the divided passageway 151 and the corresponding line 156 to the exhaust line 159. Internal air pressure and forwardly exerted pressure of the nosepiece 134 extend the diaphragm 136 forwardly as a unit, thus pulling retracted portions of the diaphragm out of the airfoil 110 through the upper and lower leading-edge slots 124A, 124B and converting the nose section 118 to a profile (Figure 3) characterized by a sharp, short-radius leading edge 179 based on the forward-side contour of the extended nosepiece 134. As the diaphragm is pulled forwardly, the guide bars 135A, 135B and retainers 138A, 138B are moved forwardly with it, and the diaphragm is halted in its fully extended position when the retainers 138A, 138B strike the stops 127A, 127B. The diaphragm portion lying between the nosepiece and the upper and lower leading-edge slots 124A, 124B is kept taut and virtually rigid by the pressure of air admitted to the inner surface of the diaphragm from the pressure regulator 168 and by forwardly directed force which continues to be exerted by the piston 130 through the rod 133 and nosepiece 134 on the extended diaphragm 136. Thus held in tension between the nosepiece 134 and guide bars 135A, 135B, the diaphragm upper and lower portions are respectively pressed tightly against the adjoining enlargements 121A, 121B and nose panel forward edges 125A, 125B at the upper and lower slots and consequently seal the slots 124A, 124B against the passage of air therethrough; hence, the diaphragm portion forward of the slots forms an airtight bag-like member. During extension of the diaphragm, the variable-dimension chambers 164A, 164B decrease in volume as the guide bars 135A, 135B move forwardly, and the resulting rise in air pressures in the chambers 164A, 164B is relieved through the divided passageway 151, the line 156 connected thereto, and the exhaust line 159. The regulator check valve 170 in the lower passageway line 154 permits airflow to the diaphragm 136 throughout the time of extension. As during that time the pressure in the cylinder line 155 is higher than pressure in the lower passageway line 154, flow would tend to occur from the cylinder line 155 through the bypass line 157 to the lower passageway line 154; but such flow is prevented by the bypass check valve 169. Reverse flow which might by any reason tend to occur at the regulator 168 is prevented by the associated check valve 170.

With continued reference to Figures 3 and 6, when the pneumatic valve 166 of Figure 3 is placed in its position connecting the pneumatic pressure line 158 to the divided passageway line 156 and the cylinder and lower passageway lines 155, 154 to the exhaust line 159, fluid pressure is admitted into the variable-dimension chambers 164A, 164B and the seals 140A, 140B, guide bars 135A, 135B, and diaphragm 136 are forced rearwardly thereby until the guide bars hold the diaphragm taut in its retracted position. During the retraction, fluid pressure in the chambers 164A, 164B presses the upper and lower seals 140A, 140B respectively against the stem portion upper and lower faces 122A, 122B, and as a result the seals prevent leakage between the upper and lower guide bars 135A, 135B and the stem portion faces 122A, 122B.

As the diaphragm is pulled inwardly by the guide bars, it moves the nosepiece, piston rod, and piston aft until the nosepiece 134 is bottomed in the channel or recess 123 between the upper and lower enlargements, the tip of the nosepiece 134 projecting forwardly far enough when in this position to back up the diaphragm 136 at the chordline of the blunt, long-radius leading edge 180 (Figure 6) defined by the retracted diaphragm 136 and the underlying stem portion end enlargements 121A, 121B. As the diaphragm is pulled back against the enlargements, most of the air enclosed within the diaphragm 136 forward of the upper and lower leading-edge slots 124A, 124B must of course be eliminated, and this occurs in the form of reverse flow through the extending passageway 148 (comprising the rod passageway 150, the forward end of the cylinder 128, and lower passageway 149), lower passageway line 154, bypass line 157, bypass check valve 169, cylinder line 155, and exhaust line 159, air pressure in the cylinder 128 also being relieved through the cylinder and exhaust lines 155, 159. Flow through the lower passageway line 154 to the pressure regulator 168 is prevented by the regulator check valve 170, and flow from the lower passageway line 154 into the cylinder line 155 through the bypass line 157 is allowed by the bypass check valve 169.

A modified control means for the extending and retracting means of Figures 3 and 6 is shown in Figure 7 and illustrates a typical control means for use when it is desired to use two different fluids, such as air on the one hand and hydraulic fluid on the other, to energize the extending and retracting means. The modified control means may be placed in a first setting in which hydraulic fluid is supplied to the cylinder line 155 through a three-way selector valve 172 connected to the cylinder line 155 and to a line 174 leading from a source of hydraulic pressure, and alternatively may be placed in a second position connecting a hydraulic return line 175 to the cylinder line 155. The hydraulic valve 172 is connected by a mechanical linkage 176 to a pneumatic selector valve 173 which is caused by the linkage 176 to be moved therewith from one to the other of two positions as the hydraulic valve 172 is changed between its first and second positions. In the first position of the hydraulic valve 172, the pneumatic valve 173 connects the lower passageway line 154 to a pneumatic pressure line 177 and the divided passageway 151 to an exhaust line 178; in the second position of the hydraulic valve, the pneumatic valve connects the divided passageway 151 to the pneumatic pressure line 177 and connects the lower passageway 149 to the exhaust line 178.

Referring to Figures 3 and 7, placing the pneumatic pressure valve 173 in its position connecting the divided passageway line 156 to the exhaust line 178 and the lower passageway line 154 to the pneumatic pressure line 177 simultaneously effects movement of the hydraulic valve 172, by motion transmitted through the mechanical linkage 176, into its position connecting the cylinder line 155 to the hydraulic pressure line 174. The consequent admission of pneumatic pressure to the inner face of the diaphragm 136 through the extending passageway 148 (Figure 6) communicating therewith and elimination of air from the variable-dimension chambers 164A, 164B through the divided passageway 151 and connected lines 156, 159, together with the accompanying admission of hydraulic pressure to the aft end of the cylinder 128 through the cylinder line 155, are accompanied by the exertion of extending and inflating forces on the diaphragm 136 which extend and rigidly inflate it to form the sharp, short-radius leading edge 179 described previously and represented in Figure 3. The diaphragm 136 is retracted to form the blunter, longer-radius leading edge profile 180 shown in Figure 6 by placing the mechanically linked pneumatic and hydraulic valves 173, 172 in their respective positions in which the cylinder line 155 is connected by the hydraulic valve 172 to the return line 175 for relieving hydraulic pressure in the cylinder 128 and allowing the discharge of fluid therefrom into the return line as the retracting diaphragm moves the nosepiece 134, piston rod 133, and piston 130 rearwardly, and the divided passageway line 156 is connected to the pneumatic pressure line 177 and the lower passageway line 154 to the exhaust line 178 by the pneumatic valve 173 for introducing fluid under pressure into the variable-dimension chambers 164A, 164B and for exhausting the air contained within the diaphragm portion extended forward of the upper and lower slots 124A, 124B.

While only one embodiment of the invention has been shown, together with a modification thereof, in the accompanying drawings, it will be evident that various other modifications are possible in the arrangement and construction of the variable-contour airfoil without departing from the scope of the invention.

I claim:

1. For a relatively fixed airfoil nose structure enclosing a chamber and having at least one spanwise slot and at least one opening in addition to said slot communicating between said chamber and the exterior of said structure, a contour changing arrangement comprising: a flexible diaphragm carried on said nose structure, said diaphragm covering an external surface portion thereof and said opening and extending through said at least one slot into said chamber, said diaphragm being partially retractable through said slot into said chamber to a position wherein said diaphragm snugly jackets said nose structure external surface portion covered thereby, and a part of said diaphragm being extendible from said chamber through said slot to a position wherein some of said diaphragm is outwardly spaced from said nose structure; and means mounted in said nose structure for selectively effecting the aforesaid extension and retraction of said diaphragm, said means being connected to said diaphragm and having communication with said diaphragm through said at least one opening in said nose structure, whereby the contour of said airfoil nose is selectively changed when said diaphragm is extended and retracted.

2. The contour changing arrangement claimed in claim 1, said means selectively operable for effecting extension and retraction of said diaphragm being of a kind utilizing energy derived from fluid pressure.

3. For an airfoil provided with a relatively fixed nose structure enclosing a chamber and having at least one spanwise slot and at least one opening in addition to said slot affording communication between said chamber and the exterior of said nose structure, a contour changing arrangement comprising: a flexible diaphragm carried on said nose structure, said diaphragm covering an external, relatively rigid surface portion thereof and extending interiorly of said chamber through said at least one slot, said diaphragm being partially retractable through said slot for drawing said diaphragm into snug, jacketing relation to said nose structure external surface portion covered thereby, and a part of said diaphragm being extendible through said slot to a position wherein an external portion of said diaphragm lies in outwardly spaced relation to said nose structure; means utilizing fluid pressure as its source of energy and having communication through said at least one opening with said diaphragm, said means being selectively operable for effecting extension of said diaphragm; and fluid motor means connected to said diaphragm and selectively operable for retraction of said diaphragm, whereby the nose contour of said airfoil is selectively changed by the extension and retraction of said diaphragm.

4. An airfoil nose contour changing arrangement as claimed in claim 3, said diaphragm having an inner surface lying nearer and an outer surface lying farther from said nose structure external surface portion covered by said diaphragm, and said means for effecting extension of said diaphragm including a passageway provided in said nose structure, said passageway having communication with a source of fluid pressure and having further communication, through said at least one opening, with said inner surface of said diaphragm.

5. An airfoil nose contour changing arrangement as claimed in claim 3, said fluid motor means operable for retraction of said diaphragm comprising at least one pulling member connected to a rearward edge of said diaphragm, said edge lying within said chamber.

6. An airfoil nose contour changing arrangement as claimed in claim 3, said diaphragm lying in sealing contact with at least one side of said at least one slot.

7. For an airfoil provided with a relatively fixed nose structure enclosing a chamber, said airfoil having at least one spanwise slot and at least one opening in addition to said slot affording communication between said chamber and the exterior of said airfoil, a contour changing arrangement comprising: a flexible diaphragm carried on said nose structure, said diaphragm covering an external, relatively rigid surface portion of said nose structure and extending interiorly of said chamber through said at least one slot, said diaphragm being partially retractable through said slot for drawing said diaphragm into snug, jacketing relation to said nose structure external surface portion covered thereby, a part of said diaphragm being extendible through said slot to a position wherein an external portion of said diaphragm lies in outwardly spaced relation to said nose structure; means utilizing fluid pressure as its source of energy and communicating with said diaphragm through said at least one opening, said means being operable for effecting extension of said diaphragm; fluid motor means connected to and operable for retraction of said diaphragm; a stop mounted in said nose structure for limiting extension of said diaphragm; and control means for selective delivery of fluid under pressure to said means operable for effecting extension of said diaphragm and to said fluid motor means operable for retraction of said diaphragm, whereby the nose contour of said airfoil is selectively changed by the extension and retraction of said diaphragm.

8. For a relatively fixed airfoil nose structure enclosing a chamber and having at least one spanwise slot extending between said chamber and the exterior of said nose structure, said nose structure further having an external surface pierced by an aperture located forwardly of said at least one slot, a contour changing arrangement comprising: a flexible, substantially non-stretchable diaphragm carried on said nose structure and covering said nose structure external surface portion pierced by said aperture, said diaphragm extending into said chamber through said at least one slot and lying in sealing contact with at least the side of said slot lying nearer the leading edge of said structure, some of said diaphragm being retractable into said chamber for drawing said diaphragm into snugly jacketing relation to said external surface portion covered thereby and extendible from said chamber for allowing movement of said diaphragm into an extended position outwardly spaced from said external surface portion covered thereby, said diaphragm when extended forming a substantially airtight, baglike member; fluid motor means operable for retraction of said diaphragm and comprising at least one pulling member connected to a rearward edge of said diaphragm lying within said chamber; a passageway in said nose structure having communication with said aperture for delivery therethrough of fluid under pressure to the surface of said diaphragm immediately overlying said aperture for effecting inflation and extension of said diaphragm; a stop mounted in said nose structure and operative for limiting extension of said diaphragm through said at least one slot; and control means connected to said fluid motor and to said passageway for the selective delivery thereto of fluid under pressure, whereby extension and retraction of said diaphragm is selectively effected and the leading edge contour of said airfoil nose structure is selectively varied.

9. A contour changing arrangement as claimed in claim 8, said control means being adapted for selectively directing compressed air to said passageway provided in said nose structure, and hydraulic fluid under pressure to said fluid motor.

10. For an airfoil having an external surface provided with an opening and a spanwise slot, said slot lying rearwardly of said opening, a contour changing arrangement comprising: a flexible, substantially non-stretchable diaphragm having a sealing attachment to said external surface of said airfoil, said sealing attachment prohibiting the passage thereat of fluids between said diaphragm and said external surface, said opening lying between said attachment and said slot and said diaphragm passing between the walls of said slot into the interior of said airfoil, said diaphragm lying in sealing, slideable contact with at least one of the walls of said slot; first pressure control means communicating through said opening with the inner surface of said diaphragm and selectively operative for applying fluid pressure thereto, whereby said diaphragm may selectively be inflated and extended to a position bearing an outwardly spaced relationship to said external surface of said airfoil; a fluid motor rigidly mounted on said airfoil and having connection to a rearward edge of said diaphragm, said edge lying within said airfoil; a stop rigidly mounted in said airfoil and adapted for limiting extension of said diaphragm through said slot; and second pressure control means operatively connected to said fluid motor, whereby some of said diaphragm may selectively be drawn through said slot into said airfoil for retraction of said diaphragm against an external surface of said airfoil.

11. For an airfoil having an external surface provided with an opening and a spanwise slot therethrough, said slot lying rearwardly of said opening, a contour changing arrangement comprising: a flexible, substantially non-stretchable diaphragm having a sealing attachment to said external surface of said airfoil prohibiting the passage thereat of fluids between said diaphragm and said external surface, said opening lying between said attachment and said slot, said diaphragm extending interiorly of said airfoil through said slot and lying in sealing contact with at least one of the walls of the latter; first pressure control means operatively communicating with said opening and with the inner surface of said diaphragm, whereby said diaphragm can be selectively inflated and extended to a position bearing an outwardly spaced relationship to said external surface of said airfoil; a member movably mounted in said airfoil and connected within said airfoil to a rearward edge of said diaphragm; a fluid motor rigidly mounted within said airfoil and operatively connected to said movable member; a stop rigidly mounted in said airfoil and adapted for limiting motion of said movable member in a direction permitting extension of said diaphragm through said slot; and a second pressure control means operatively connected to said fluid motor, whereby said movable mounted member may selectively be moved in a direction wherein some of said diaphragm is retracted into said airfoil and an exterior portion of said diaphragm is drawn nearer said external surface of said airfoil.

12. A contour changing arrangement such as claimed in claim 11, said movable member being rotatably mounted on a fixed member within said airfoil.

13. A contour changing arrangement as claimed in claim 11, said spanwise slot being formed in a lower surface of said airfoil, said diphragm when extended forming a relatively rigid, partially cylindrical body extending below the leading edge of said airfoil, said first pressure control means selectively furnishing compressed air to said opening, and said second pressure control means selectively supplying hydraulic fluid under pressure to said fluid motor.

14. An airfoil comprising: a relatively fixed forward structure having an opening through its external surface in the vicinity of the leading edge of said airfoil, said external surface further being pierced by at least one spanwise slot located rearwardly of said opening; a movable member mounted in said structure and extendible therefrom through said opening; a leading-edge skin movably carried on and extending spanwise of said fixed structure, said skin covering an external surface portion of said fixed structure and said opening and movably extending through said at least one spanwise slot into said structure, at least a major portion of said skin being rearwardly and forwardly positionable relative to said fixed structure and inwardly and outwardly movable through said at least one slot; pressure control means having communication with a surface of said skin and operative for applying inflating and rigidifying fluid pressure thereto; and means provided in said airfoil for extension of said movable member from said fixed structure through said opening, whereby said leading-edge skin may be moved forwardly relative to said fixed structure and rigidly inflated, the contour of said airfoil thereby being changed.

15. An airfoil comprising: a relatively fixed airfoil structure having a leading edge and provided with an opening through the external surface thereof in the vicinity of said leading edge, said structure further having a pair of spanwise slots through the external surface thereof, said slots being located on opposite sides of said opening; a member movably mounted by said structure in said opening forwardly extensible therefrom; a leading-edge sheath carried by and extending spanwise of said structure in covering relation to a portion of said external surface thereof pierced by said opening, said sheath extending through said spanwise slots into said airfoil and being rearwardly and forwardly positionable relative to said leading edge of said fixed structure and rearwardly and forwardly movable through said slots; pressure control means having communication with the inner surface of said sheath forward of said slots and operative for applying inflating and rigidifying fluid pressure to said inner surface of said sheath; and means mounted in said airfoil and contacting said movable member for extension of the same from said fixed structure through said opening against said sheath, whereby said leading-edge sheath may be moved forwardly relative to said fixed structure and rigidly inflated, the contour of said airfoil thereby being changed.

16. A variable-contour airfoil comprising: a relatively fixed structure constituting a forward portion of said airfoil; spaced-apart upper and lower surface members on said fixed structure; a housing member rigidly mounted in said fixed structure and extending between and in spaced relation to the leading edges of said upper and lower surface members to define first and second spanwise slots affording communication between the interior and exterior of said fixed structure, said housing member extending a substantial distance rearwardly of said slots and being provided with an axially extending leading-edge opening; first and second retaining members having forward faces and being movably mounted in said fixed structure on opposite sides of said housing member, said retaining members being movable on said housing member in a chordwise direction relative to said airfoil; a leading edge sheath extending through said slots, covering said housing member at the leading edge thereof, and having first and second rearward margins attached respectively to said retaining members, said sheath being extendible and retractable relative to said fixed structure through said slots; at least one stop mounted in said fixed structure and adapted for limiting forward motion of said sheath; a member mounted in said axial opening of said housing member and extendible therefrom against the inner surface of said sheath for moving said sheath forwardly, thereby drawing some of said sheath outwardly through said slots; and fluid pressure energized means connected to said member mounted in said axial opening of said housing member and provided with communication with said forward face of at least one of said retaining members, said fluid pressure energized means being selectively operable for effecting rearward movement of said retaining members on said housing member for drawing some of said sheath inwardly through said slots, thereby retracting said sheath, and for effecting extension of said member and said sheath by extension of said member mounted in said axial opening, whereby the contour of said airfoil is selectively changed by extension and retraction of said sheath.

17. For an airfoil having a relatively fixed forward-portion structure including spaced-apart upper and lower outer surface members, a contour varying arrangement comprising: a housing member rigidly mounted in and extending spanwise of said fixed structure, said housing member having a leading edge portion lying between and in spaced relation to the leading edges of said upper and lower surface members and therewith defining upper and lower spanwise slots affording communication between the interior and exterior of said airfoil forward-portion fixed structure; smooth upper and lower faces formed on said housing member and extending rearwardly a substantial distance from said upper and lower slots; an axially disposed passage opening through the leading edge of said housing member; a rod slideably mounted in said axially disposed passage; a piston slideably mounted in said axially disposed passage and adapted for transmitting forwardly urging forces to said rod; a nosepiece extending spanwise of said airfoil and mounted at the leading edge of said housing member on said rod; an extending passage provided in said forward portion structure and communicating with the exterior thereof between said upper and lower slots; upper and lower retaining members respectively mounted on said upper and lower faces of said housing member and rearwardly and forwardly movable thereon in said forward portion structure; sealing means for preventing leakage between said upper and lower retaining members and said upper and lower faces of said housing member; at least one stop rigidly mounted in said forward portion structure and adapted for limiting forward motion of at least one of said retaining members; an airtight sheath extending sealingly through said slots, said sheath covering the leading edge of said housing member and having upper and lower rearward margins sealingly attached to said upper and lower retaining members; a retracting passage provided in said forward-portion structure and communicating, inside said forward-portion structure, with the interior of said sheath; and pressure control means connected to said axially disposed passage, extending passage, and retracting passage for selective delivery of fluid under pressure to said axially disposed and extending passages or to said retracting passage, whereby said sheath is selectively extended through said slots and from said housing or retracted through said slots and toward said housing, thereby selectively changing the contour of said airfoil.

18. An airfoil such as claimed in claim 17, said pressure control means supplying fluid from a first source to said extending and retracting passages and supplying fluid from a second source to said axially disposed passage.

19. An airfoil nose structure having a fixed external surface and containing a chamber; at least one slot passing through said fixed external surface into said chamber; at least one opening through said surface forward of said at least one slot; a flexible diaphragm mounted on said airfoil and covering a portion of said external fixed surface, a variable portion of said diaphragm slideably and sealedly extending through said at least one slot into said chamber, and said diaphragm being movable into a retracted position wherein it snugly jackets said portion of said fixed external surface covered thereby and into an extended position wherein it lies in outwardly spaced relation with said fixed external surface; means for moving said diaphragm into said extended position thereof said means being mounted in said chamber and having communication through said opening with said diaphragm; and actuating means mounted in said airfoil and having attachment within said chamber to at least one margin of said diaphragm, said actuating means being selectively operable for moving said diaphragm into said retracted position thereof and for feeding some of said diaphragm outwardly through said slot to permit movement of said diaphragm to said extended position thereof, whereby the contour of said airfoil is selectively changed by the extension of retraction of said diaphragm.

20. For a relatively fixed airfoil nose structure enclosing a chamber and having at least one spanwise slot communicating between said chamber and the exterior of said structure, a contour changing arrangement comprising: a flexible diaphragm carried on and having a surface snugly jacketing an external surface portion of said nose structure, said diaphragm extending through said at least one slot into said chamber and having a part movable from said chamber through said slot for repositioning said diaphragm in a manner wherein some of said diaphragm is outwardly spaced from said nose structure; means in said nose structure providing communication between the interior thereof and said surface of said diaphragm jacketing said external surface portion of said nose structure; and a source of fluid pressure connected to said means, said source being operative for applying fluid pressure to said diaphragm in a manner yielding an inflation thereof which imposes on said diaphragm forces effective in causing movement of part of said diaphragm from said chamber through said slot, whereby the contour of said nose structure is changed.

21. A contour changing arrangement such as claimed in claim 20, said arrangement further comprising: an extendible member reciprocably mounted on said nose structure and engageable with said surface of said diaphragm; and actuating means having connection with said member for extending the same against said diaphragm for varying the contour of said airfoil nose structure.

22. In a variable-contour nose structure for an airfoil of the class comprising a sheath lying in covering relation with a leading edge included by said nose structure, said sheath being positionable in outwardly spaced relation with said leading edge for endowing said leading edge with a given contour and having an inner surface adjacent said leading edge, said nose structure further comprising means for positioning said sheath in said outwardly spaced relation with said leading edge, the combination with said sheath of an arrangement for changing said contour, said arrangement comprising: at least one spanwise slot in said nose structure, said slot lying rearwardly of said leading edge and providing communication between the interior and exterior of said nose structure; a portion of said sheath movably extending through said slot into the interior of said nose structure; and actuating means mounted in said nose structure and having connection with said portion of said sheath movable through said slot into the interior of said nose structure, said actuating means being operable for moving said portion of said sheath through said slot into the interior of said nose structure until portions of said sheath remaining outside said nose structure lie in closely jacketing relationship with said leading edge.

23. In a variable-contour nose structure for an airfoil of the class comprising a sheath movably mounted on said nose structure and having an inner surface covering a leading edge included by said nose structure, the combination with said sheath of a contour changing arrangement comprising: an extendible member reciprocably mounted on said structure and engageable with said inner surface of said sheath; actuating means having connection with said member for extending the same against said sheath for forcing said sheath forwardly relative to said leading edge; a spanwise slot in said nose structure rearwardly of said leading edge, said slot providing communication between the interior and exterior of said nose structure; a portion of said sheath extending through said slot into the interior of said nose structure, said sheath portion being movable inwardly and outwardly relative to said nose structure through said slot; actuating means having connection with said portion of said sheath extending through said slot and operable for moving said portion of said sheath through said slot into said nose structure until portions of said sheath remaining outside said nose structure have forced said extendible member rearwardly and lie in closely jacketing relation with said leading edge.

References Cited in the file of this patent
UNITED STATES PATENTS

| 2,343,986 | Lentholt | Mar. 14, 1944 |
| 2,378,528 | Arsandaux | June 19, 1945 |
| 2,763,448 | Davie | Sept. 18, 1956 |